United States Patent [19]
Brooks et al.

[11] Patent Number: 5,961,636
[45] Date of Patent: Oct. 5, 1999

[54] CHECKPOINT TABLE FOR SELECTIVE INSTRUCTION FLUSHING IN A SPECULATIVE EXECUTION UNIT

[75] Inventors: Jeffrey Scott Brooks, Round Rock; Hoichi Cheong, Austin, both of Tex.; Tiberiu Carol Galambos, Haifa, Israel; Christopher Hans Olson, Austin, Tex.

[73] Assignee: International Business Machines Corporation, Armonk, N.Y.

[21] Appl. No.: 08/934,960

[22] Filed: Sep. 22, 1997

[51] Int. Cl.⁶ .................................................. G06F 9/302
[52] U.S. Cl. ........................................... 712/228; 712/222
[58] Field of Search .......................... 395/569; 712/222, 712/228

[56] References Cited

U.S. PATENT DOCUMENTS

| | | |
|---|---|---|
| 5,134,561 | 7/1992 | Liptay . |
| 5,418,916 | 5/1995 | Hall et al. . |
| 5,452,426 | 9/1995 | Papworth et al. . |
| 5,454,117 | 9/1995 | Puziol et al. . |
| 5,481,683 | 1/1996 | Karim . |
| 5,493,669 | 2/1996 | Denman, Jr. . |
| 5,499,352 | 3/1996 | Clift et al. . |
| 5,500,950 | 3/1996 | Becker et al. . |
| 5,551,043 | 8/1996 | Crump et al. . |
| 5,561,776 | 10/1996 | Popescu et al. . |
| 5,574,928 | 11/1996 | White et al. . |
| 5,586,278 | 12/1996 | Papworth et al. . |
| 5,659,721 | 8/1997 | Shen et al. ................................ 395/569 |
| 5,696,955 | 12/1997 | Goddard et al. ......................... 395/563 |
| 5,805,906 | 9/1998 | Cheong et al. .......................... 395/733 |
| 5,826,070 | 10/1998 | Olson et al. ............................. 395/563 |

FOREIGN PATENT DOCUMENTS

| | | |
|---|---|---|
| 0 649 086 A1 | 4/1995 | European Pat. Off. . |
| 0 686 913 A2 | 5/1995 | European Pat. Off. . |
| 0 686 913 A3 | 12/1995 | European Pat. Off. . |
| 730225-A2 | 1/1996 | European Pat. Off. . |
| WO 96/12228 | 4/1996 | WIPO . |

*Primary Examiner*—William M. Treat
*Attorney, Agent, or Firm*—Kelly K. Kordzik; Winstead Sechrest & Minick P.C.; Anthony V. S. England

[57] ABSTRACT

In a data processing system having a processor, which dispatches floating point instructions to a floating point unit, a checkpoint table is associated with a floating point register rename table for restoring the state of the floating point register rename table upon the occurrence of a mispredicted branch or an interrupt. This is accomplished (1) using a program order tag associated with each one of the instructions, (2) by replacing the valid bit vector of the floating point register rename table with the valid bit vector of a checkpoint entry whose program order tag is the oldest among all checkpoint entries that have a program order tag younger or as old as the program order tag of the mispredicted branch or the interrupted instruction, and (3) by using the location portion of the checkpoint entry to replace the NEXT pointer of the register renaming table.

13 Claims, 6 Drawing Sheets

| | ARCHITECTED | PHYSICAL | V | |
|---|---|---|---|---|
| 1 | | | | |
| 2 | | | | |
| 3 | | | | |
| 4 | | | | |
| ... | | | | |
| 22 | | | | ← HEAD |
| 23 | | | | |
| 24 | | | | |

| | GID | TID | HEAD | VALID |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |

CHECKPOINT TABLE FOR SELECTIVE INSTRUCTION FLUSHING IN A SPECULATIVE EXECUTION UNIT

CROSS-REFERENCE TO RELATED PATENT APPLICATIONS

The present application is related to the following applications:

"METHOD FOR FAST UNIFIED INTERRUPT AND BRANCH RECOVERY SUPPORTING FULL OUT-OF-ORDER EXECUTION", U.S. patent application, Ser. No. 08/829,662, which is hereby incorporated by reference herein;

"FORWARDING OF RESULTS OF STORE INSTRUCTIONS," U.S. patent application, Ser. No. 08/826,854, which is hereby incorporated by reference herein; and "SUPPORT FOR OUT-OF-ORDER EXECUTION OF LOADS AND STORES IN A PROCESSOR," U.S. patent application, Ser. No. 08/829,669, which is hereby incorporated by reference herein;

TECHNICAL FIELD

The present invention relates in general to data processing systems, and in particular, to a checkpoint table for selective instruction flushing in a speculative execution unit.

BACKGROUND INFORMATION

A microprocessor implementation that speculatively executes instructions along a predicted path, and provides the means to quickly and selectively flush incorrect speculative results, must provide means for restoring the state of the execution unit's rename registers to the state that existed prior to executing instructions on the mispredicted path. Designs utilizing a circular table pointer mechanism to drive the register rename table restore a pointer state in addition to the rename register valid bits normally restored. Generally, a circular table pointer mechanism design requires that one register rename table state be saved for each unresolved branch or interruptible operation present in the machine. Given that the trend in microprocessor implementations is to allow more unresolved branches and interruptible operations in the machine at one time, the area, power consumption, and complexity required to save one register rename table state for each unresolved branch or interruptible operation the machine becomes problematic.

A method which reduces the number of register rename table states that must be saved pending branch and interrupt resolution would reduce area and power consumption, and simplify the design.

The PowerPC 604 microprocessor does not use a circular table pointer mechanism to drive the register rename table, but instead uses a more classic register renaming technique where the rename register data is moved from the rename register to the architected register when it is committed (in contrast, table pointer mechanism designs do not move data, only physical register addresses). However, the 604 does provide a selective flush mechanism. The 604 maintains a set of rename register valid bits for each unresolved branch present in the machine. If a conditional branch is resolved and the predicted path was incorrect, the register rename table is restored to the state that existed prior to executing instructions on the incorrect instruction path.

SUMMARY OF THE INVENTION

The foregoing need is addressed by the present invention which reduces the checkpoint table associated with a floating point register rename table, thus providing significant area and power consumption savings, while simplifying the design, by reducing the number of register rename table states that must be saved pending predicted branch and interrupt resolution.

In one embodiment, the present invention comprises a processor having an instruction dispatch unit operable for dispatching instructions to various execution units, including a floating point unit, a floating point register rename table associated with the floating point unit and operable for storing states of registers of the floating point unit for dispatched floating point instructions, and a checkpoint table operable for storing states of the floating point register rename table for the dispatched floating point instructions.

In a further embodiment, the dispatched floating point instructions for which checkpoint table entries are made are non-store instructions, have not been previously committed, and each have a new group identifier tag which uniquely identifies a set of contiguous instructions (GID).

When a branch instruction is determined to be mispredicted, a valid bit vector of an entry of the checkpoint table associated with the program order tag of the mispredicted branch instruction is used to restore the floating point register rename table to a state prior to the mispredicted branch instruction.

When an interrupt occurs, the floating point register rename table is restored by the checkpoint table to a state before the interrupt by replacing the valid bit vector of the floating point register rename table with the valid bit vector of an entry of the checkpoint table associated with a location pointer indicating an oldest valid entry in the checkpoint table.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, table sizes, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Before describing the present invention, an "interruptible instruction" will be described.

If one instruction is dependent on a first instruction and the instructions are to be processed concurrently or the dependent instruction is to be processed before the first instruction, an assumption must be made regarding the result produced by the first instruction. The state of the processor, as defined at least in part by the content of registers the processor uses for execution of instructions, may change from cycle to cycle. If an assumption used for processing an instruction proves to be incorrect then, of course, the result produced by the processing of the instruction will almost certainly be incorrect, and the processor state must recover to a state with known correct results up to the instruction for which the assumption is made. (Herein, an instruction for which an assumption has been made is referred to as an "interruptible instruction", and the determination that an assumption is incorrect, triggering the need for the processor state to recover to a prior state, is referred to as an "interruption" or an "interrupt point".) In addition to incorrect assumptions, there are other causes of such interruptions requiring recovery of the processor state. Such an interruption is generally caused by an unusual condition arising in connection with instruction execution, error, or signal external to the processor.

Refer now to the drawings wherein depicted elements are not necessarily shown to scale and wherein like or similar elements are designated by the same reference numeral through the several views.

Figure 1:
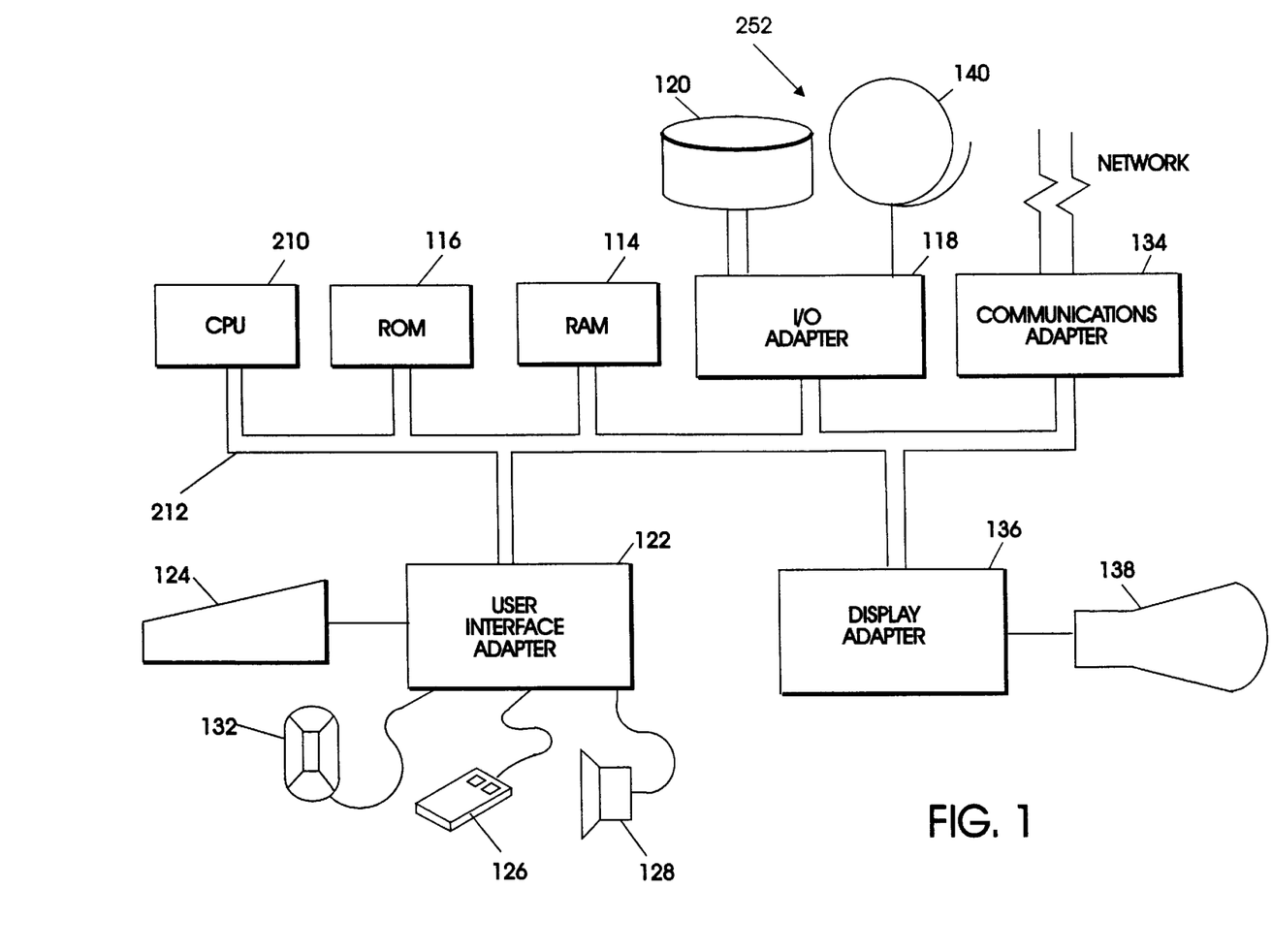
FIG. 1 illustrates, in block diagram form, a data processing system configured in accordance with the present invention.

Referring first to FIG. 1, an example is shown of a data processing system configurable in accordance with the present invention. The system has a central processing unit ("CPU") 210, such as a PowerPC microprocessor ("PowerPC" is a trademark of IBM Corporation) according to the "*PowerPC Architecture: A Specification for a New Family of RISC Processors*," 2d edition, 1994, Cathy May, et al. Ed., which is hereby incorporated by reference herein. A more specific implementation of a PowerPC microprocessor is described in the "*PowerPC 604 RISC Microprocessor User's Manual*," 1994, IBM Corporation, which is hereby incorporated by reference herein.

The CPU 210 is coupled to various other components by system bus 211. Read only memory ("ROM") 116 is coupled to the system bus 211 and includes a basic input/output system ("BIOS"), which controls certain basic functions of the data processing system. Random access memory ("RAM") 250, I/O adapter 118, and communications adapter 134 are also coupled to the system bus 211. I/O adapter 118 may be a small computer system interface ("SCSI") adapter that communicates with a disk storage device 120 or tape storage drive 140. I/O adapter 118, disk storage device 120, and tape storage device 140 are also referred to herein as mass storage 252. Communications adapter 134 interconnects bus 211 with an outside network enabling the data processing system to communicate with other such systems.

Input/output devices are also connected to system bus 211 via user interface adapter 122 and display adapter 136. Keyboard 124, trackball 132, mouse 126, and speaker 128 are all interconnected to bus 211 via user interface adapter 122. Display monitor 138 is connected to system bus 211 by display adapter 136. In this manner, a user is capable of inputting to the system through the keyboard 124, trackball 132, or mouse 126 and receiving output from the system via speaker 128 and display 138. Additionally, an operating system such as AIX ("AIX" is a trademark of the IBM Corporation) is used to coordinate the functions of the various components shown in FIG. 1.

Figure 2:
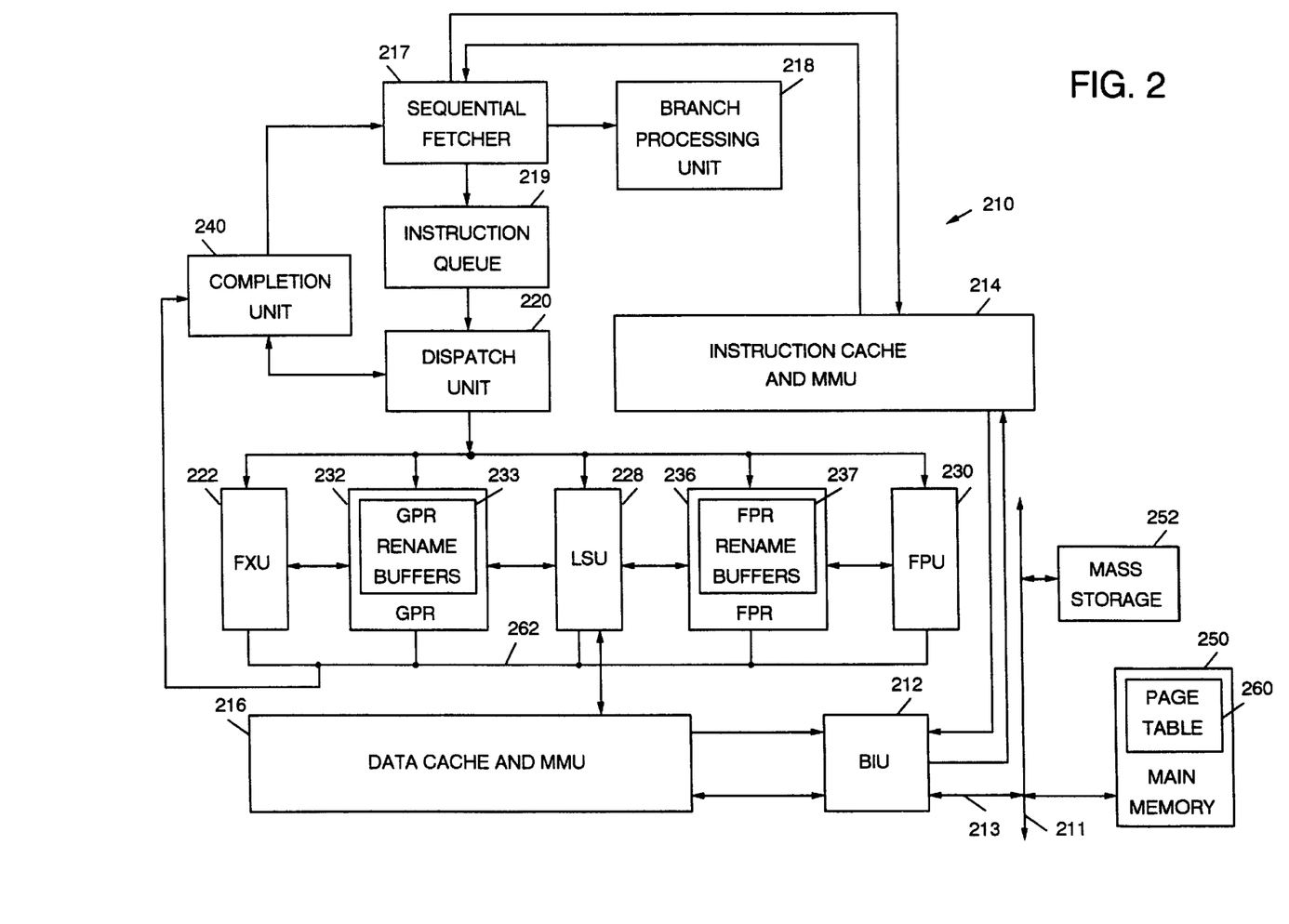
FIG. 2 illustrates, in block diagram form, a processor system configured in accordance with the present invention.

With reference now to the figures and in particular with reference to FIG. 2, there is depicted a block diagram of an illustrative embodiment of a data processing system for processing information in accordance with the invention recited within the appended claims. In the depicted illustrative embodiment, CPU 210 comprises a single integrated circuit superscalar microprocessor. Accordingly, as discussed further below, CPU 210 includes various execution units, registers, buffers, memories, and other functional units, which are all formed by integrated circuitry. As illustrated in FIG. 2, CPU 210 is coupled to system bus 211 via bus interface unit (BIU) 212 and processor bus 213, which like system bus 211 includes address, data, and control buses. BIU 212 controls the transfer of information between processor 210 and other devices coupled to system bus 211, such as main memory (RAM) 250 and nonvolatile mass storage 252, by participating in bus arbitration. The data processing system illustrated in FIG. 2 may include other unillustrated devices coupled to system bus 211, which are not necessary for an understanding of the following description and are accordingly omitted for the sake of simplicity.

BIU 212 is connected to instruction cache and MMU (Memory Management Unit) 214 and data cache and MMU 216 within CPU 210. High-speed caches, such as those within instruction cache and MMU 214 and data cache and MMU 216, enable CPU 210 to achieve relatively fast access times to a subset of data or instructions previously transferred from main memory 250 to the caches, thus improving the speed of operation of the data processing system. Data and instructions stored within the data cache and instruction cache, respectively, are identified and accessed by address tags, which each comprise a selected number of high-order bits of the physical address of the data or instructions in main memory 250. Instruction cache and MMU 214 is further coupled to sequential fetcher 217, which fetches instructions for execution from instruction cache and MMU 214 during each cycle. Sequential fetcher 217 transmits branch instructions fetched from instruction cache and MMU 214 to branch processing unit ("BPU") 218 for execution, but temporarily stores sequential instructions within instruction queue 219 for execution by other execution circuitry within CPU 210.

In the depicted illustrative embodiment, in addition to BPU 218, the execution circuitry of CPU 210 comprises multiple execution units for executing sequential instructions, including fixed-point-unit ("FXU") 222, load store unit ("LSU") 228, and floating-point unit ("FPU") 230, Each of execution units 222, 228 and 230 typically executes one or more instructions of a particular type of sequential instructions during each processor cycle. For example, FXU 222 performs fixed-point mathematical and logical operations such as addition, subtraction, ANDing, ORing, and XORing, utilizing source operands received from specified general purpose registers ("GPRs") 232. Following the execution of a fixed-point instruction, FXU 222 outputs the data results of the instruction to GPR buffers 232, which provide storage for the result received on result bus 262. Conversely, FPU 230 typically performs single and double-precision floating-point arithmetic and logical operations, such as floating-point multiplication and division, on source operands received from floating-point registers ("FPRs") 236. FPU 230 outputs data resulting from the execution of floating-point instructions to selected FPR buffers 236, which store the result data. As its name implies, LSU 228 typically executes floating-point and fixed-point instructions which either load data from memory (i.e., either the data cache within data cache and MMU 216 or main memory 250) into selected GPRs 232 or FPRs 236 or which store data from a selected one of GPRs 232 or FPRs 236 to memory 250.

CPU 210 employs both pipelining and out-of-order execution of instructions to further improve the performance of its superscalar architecture. Accordingly, instructions can be executed by FXU 222, LSU 228, and FPU 230 in any order as long as data dependencies are observed. In addition, instructions are processed by each of FXU 222, LSU 228, and FPU 230 at a sequence of pipeline stages. As is typical of high-performance processors, each sequential instruction is processed at five distinct pipeline stages, namely, fetch, decode/dispatch, execute, finish, and completion.

During the fetch stage, sequential fetcher 217 retrieves one or more instructions associated with one or more memory addresses from instruction cache and MMU 214. Sequential instructions fetched from instruction cache and MMU 214 are stored by sequential fetcher 217 within instruction queue 219. In contrast, sequential fetcher 217 removes (folds out) branch instructions from the instruction stream and forwards them to BPU 218 for execution. BPU 218 includes a branch prediction mechanism, which in one embodiment comprises a dynamic prediction mechanism such as a branch history table. That enables BFU 218 to speculatively execute unresolved conditional branch instructions by predicting whether or not the branch will be taken.

During the decode/dispatch stage, dispatch unit 220 decodes and dispatches one or more instructions from instruction queue 219 to execution units 222, 228, and 230, typically in program order. In a more conventional processor, dispatch unit 220 allocates a rename buffer within GPR rename buffers 233 or FPR rename buffers 237 for each dispatched instruction's result data, and at dispatch, instructions are also stored within the multiple-slot completion buffer of completion unit 240 to await completion. However, the present invention is adaptable to embodiments which require neither rename registers or completion units. According to the depicted illustrative embodiment, CPU 210 tracks the program order of the dispatched instructions during out-of-order execution utilizing unique instruction identifiers.

During the execute stage, execution units 222, 228, and 230 execute instructions received from dispatch unit 220 opportunistically as operands and execution resources for the indicated operations become available. In one embodiment, each of execution units 222, 228, and 230 are equipped with a reservation station that stores instructions dispatched to that execution unit until operands or execution resources become available. After execution of an instruction has terminated, execution units 222, 228, and 230 store data results, if any, within either GPRs or FPRs, depending upon the instruction type. In more conventional processors, execution units 222, 228, and 230 notify completion unit 240 which instructions have finished execution. Finally, instructions are completed in program order out of the completion buffer of completion unit 240, Instructions executed by FXU 222 and FPU 230 are completed by transferring data results of the instructions from GPR rename buffers 233 and FPR rename buffers 237 to GPRs 232 and FPRs 236, respectively. Load and store instructions executed by LSU 228 are completed by transferring the finished instructions to a completed store queue or a completed load queue from which the load and store operations indicated by the instructions will be performed.

However, in various embodiments, the invention utilizes the dispatch logic of the processor to "tokenize" a classical Von Neumann instruction stream into a data flow-style format. Thus, data dependencies are not handled by tracking the storage location of source data required by each instruction, as in register renaming, but rather by associating with an instruction certain information which enables tracking source data by reference to another instruction which is to provide the source data. Accordingly, the processor is provided with a target identification ("TID") generator which generates tokens, or tags, each of which is uniquely associated with an instruction upon dispatch. The TIDs are used to retain program order information and track data dependencies.

The dispatch unit 220 in the present invention not only assigns TIDs and dispatches instructions, but also updates various tables which are used to track the status of the dispatched instructions.

The CPU 210 supports out-of-order speculative instruction execution. Instructions may be speculative on a predicted branch direction or speculative beyond an instruction that may cause an interrupt condition. In the event of a branch misprediction or an interrupt, hardware automatically flushes undesired instructions from the pipelines and discards undesired results, presenting the effect of precise exceptions and sequentially executed instructions down the appropriate branch paths. Up to four unresolved predicted branches are supported in the machine. Incorrect speculative results are selectively flushed from the FPU in one clock cycle, and instruction dispatch can resume the following clock cycle. A total of 12 outstanding branch or interruptible instructions are allowed in the machine at one time. One group identifier tag ("GID") is assigned per set of instructions bounded by outstanding branch or interruptible instructions.

The IDU 220 dispatches speculative in-order instructions to the floating-point instruction queue ("FPQ") (not shown). The FPQ issues speculative out-of-order instructions to dual floating-point execution pipelines in FPU 230. Up to three instructions can be dispatched to the FPQ per clock cycle. Each dispatched instruction has a GID and a TID which identifies the target architected facility of the instruction and is used to maintain program order. Floating-point register renaming is implemented using a circular table pointer mechanism. There are 56 physical entries in the floating-point register file. On any given clock cycle, 32 of the 56 physical registers represent the architected set of floating-point registers, and the other 24 entries represent rename registers.

Figure 3:
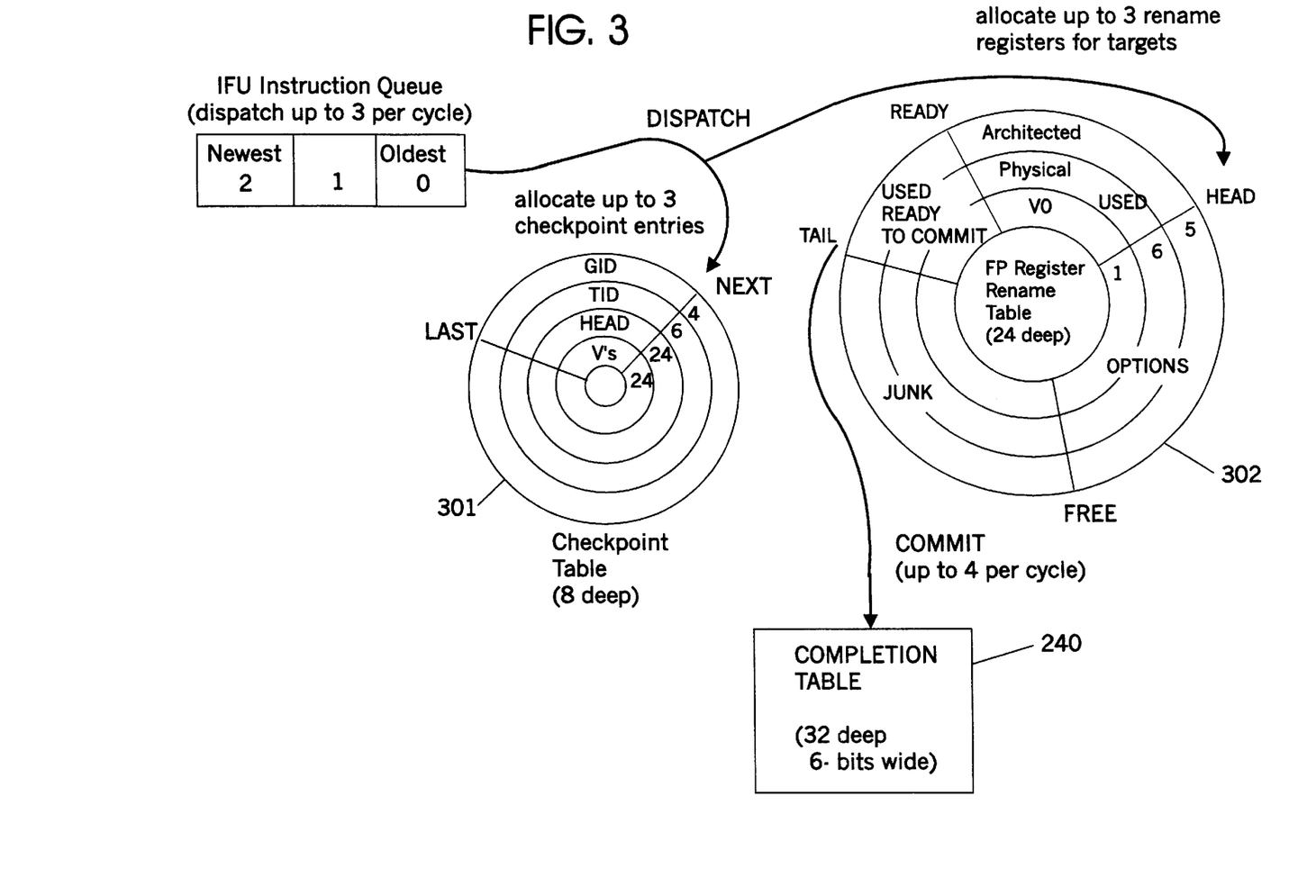
FIG. 3 illustrates a high level diagram of a checkpoint mechanism and a floating point register rename mechanism in accordance with the present invention.

Referring to FIG. 3, the floating-point register rename table 302 contains a HEAD pointer (also see FIG. 4) which points to the first available empty location in the table 302, a TAIL pointer which points to the oldest valid entry in the table 302, a FREE pointer which points to the last available empty location in the table 302, and a READY pointer which points to the newest valid entry ready to be committed. Each rename table entry contains a 5-bit architected register address, a 6-bit physical register address, and a valid bit (referred to as the V0 bits).

Up to four floating-point instructions may commit per clock cycle. In order for a floating-point instruction to commit, its GID must have been committed by the IDU 220, and the instruction must have finished execution (i.e. data must be home in the FPU 230). When committed, an instruction's target physical address is read from the register rename table 302, and written into the completion table (unit) 240. The completion table 240 is 32 deep, containing one entry for each architected floating-point register. The completion table 240 maps architected addresses to committed physical addresses.

The FPU 230 utilizes a checkpoint table 301 (also see FIG. 5), also known as an instruction interrupt table IIT, to save the state of the floating-point register rename table 302. The checkpoint table 301 contains a LAST pointer, which points to the oldest valid entry in the table 301, and a NEXT pointer, which points to the first available empty location in the table 301.

Figure 6:
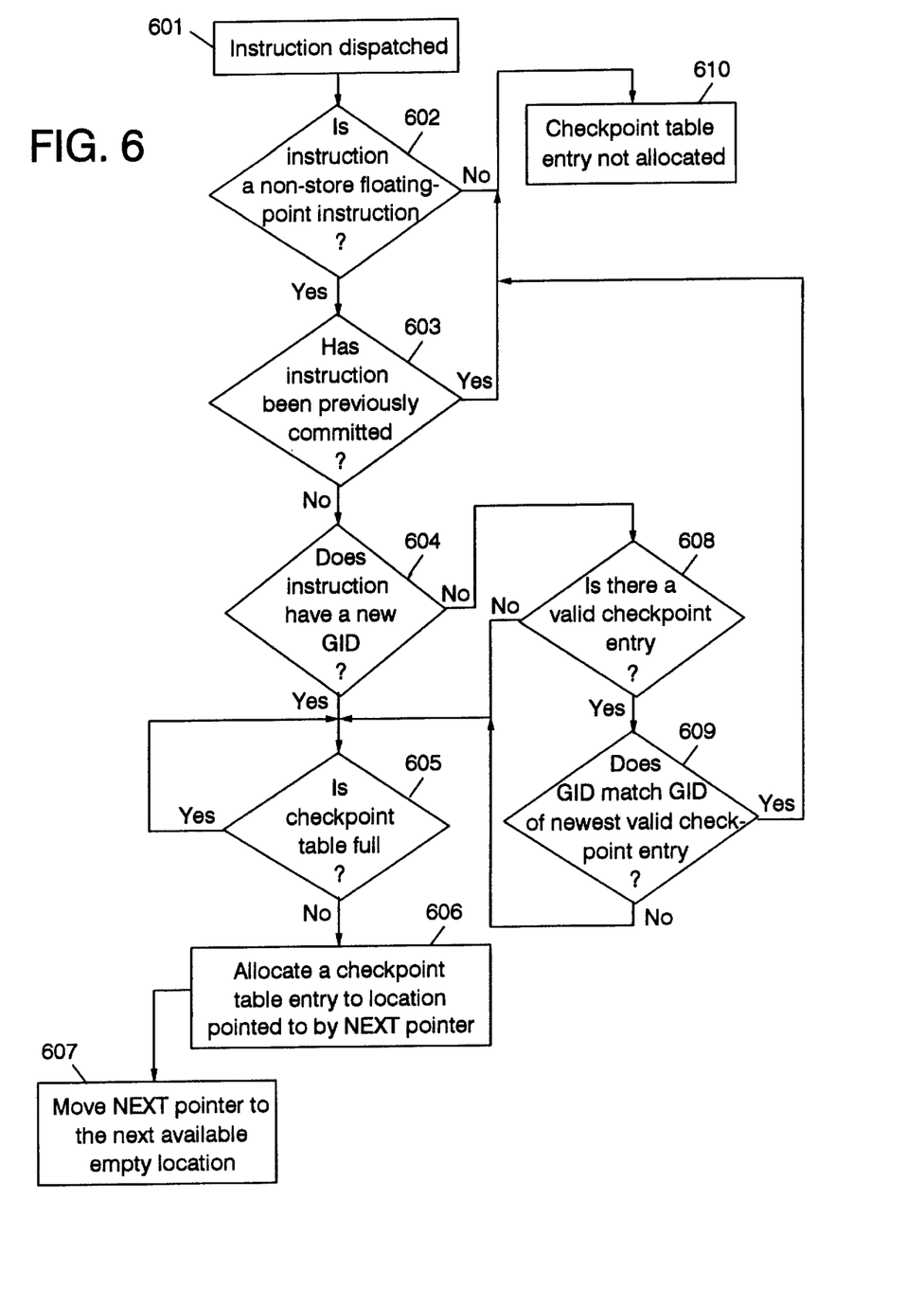
FIG. 6 illustrates a flow diagram of a process for adding entries to a checkpoint table in accordance with the present invention.

Referring to FIG. 6, entries in the checkpoint table 301 are created during dispatch (step 601). One entry is allocated for each dispatched instruction meeting the following conditions:

1. The instruction is a non-store floating-point instruction (step 602).
2. The instruction has a new GID (step 604) (or a GID that does not presently exist in the floating-point checkpoint table 301 (step 609)).
3. The instruction has not been previously committed (step 603).

The general practice would be to allocate a checkpoint table entry for every dispatched instruction with a new GID that has not been previously committed, thus excluding condition 1 listed above. Because there are a total of 12 uncommitted GIDs allowed in the machine 210 at one time, this would result in as many as 12 checkpoint entries. However, program trace analysis indicates that in many instances a GID will not contain a floating-point instruction, and thus does not require a checkpoint table entry in the FPU 230. Thus, 8 checkpoint table entries are provided.

If the depth of the checkpoint table 301 is less than the number of uncommitted GIDs allowed in the machine 210, the challenge is to determine if a floating-point instruction that does not have a new GID needs to allocate a checkpoint table entry. For example, assume that an instruction dispatch packet contains three integer unit instructions, and the oldest of the three instructions has a new GID. The FPU 230 will not allocate a checkpoint table entry (step 610) because the instruction is not a floating-point instruction (step 602). Now assume that on the next clock cycle the instruction dispatch packet contains a single floating-point instruction that does not have a new GID (step 604). In this case, the FPU 230 should allocate a checkpoint table entry because a checkpoint table entry does not already exist for it. Since the IDU 220 does not indicate to the FPU 230 that the floating-point instruction has a new GID (because it does not) the FPU 230 compares the dispatched GID with the GID contained in the newest valid checkpoint table entry (step 609). If the GID does not match, and the instruction has not been previously committed, then a checkpoint table entry is allocated (step 606). Or, if there is no valid checkpoint table entry (step 608), and the instruction has not been previously committed (step 603), then a checkpoint table entry is allocated (step 606). It is possible that in extreme circumstances, 8 checkpoint table entries may not be sufficient. If the checkpoint table 301 becomes full (step 605), instruction dispatch is held until at least one entry is freed up.

A new checkpoint table entry is written to the location in the checkpoint table 301 pointed to by the NEXT pointer (step 606). Each entry in the checkpoint table 301 includes a 4-bit GID, a 24-bit HEAD pointer, a 6-bit TID, and a 24-bit set of valid bits. A checkpoint table entry represents a snapshot of the register rename table's HEAD pointer and V0 bits at instruction dispatch, plus the corresponding GID and TID. After instruction dispatch, the NEXT pointer moves to the next available empty location in the table 301 (step 607).

When the IDU 220 commits a GID, the checkpoint table 301 calculates the new value of the READY pointer of the circular renaming table. The READY pointer is derived from either the value of the current HEAD pointer, or from one of the HEAD pointer values stored in the checkpoint table 301. The LAST pointer moves clockwise, one tick past the checkpoint entry containing the newest committing GID.

Figure 4:
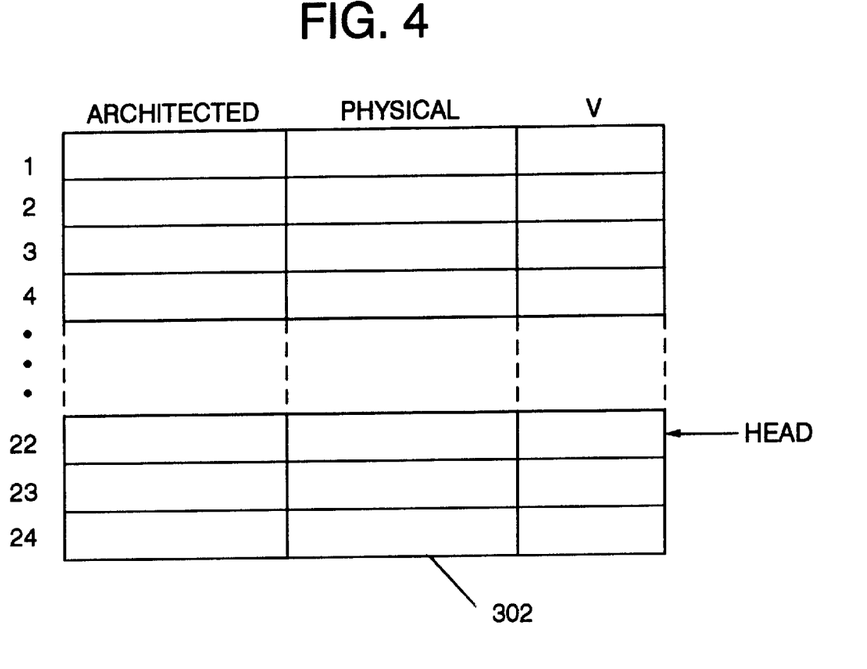
FIG. 4 illustrates a floating point register rename table.
Figure 5:
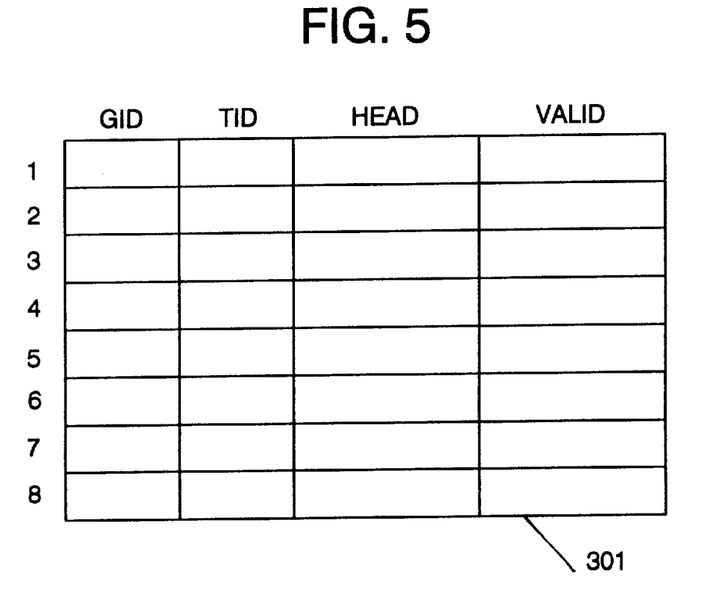
FIG. 5 illustrates a checkpoint table.
Figure 7:
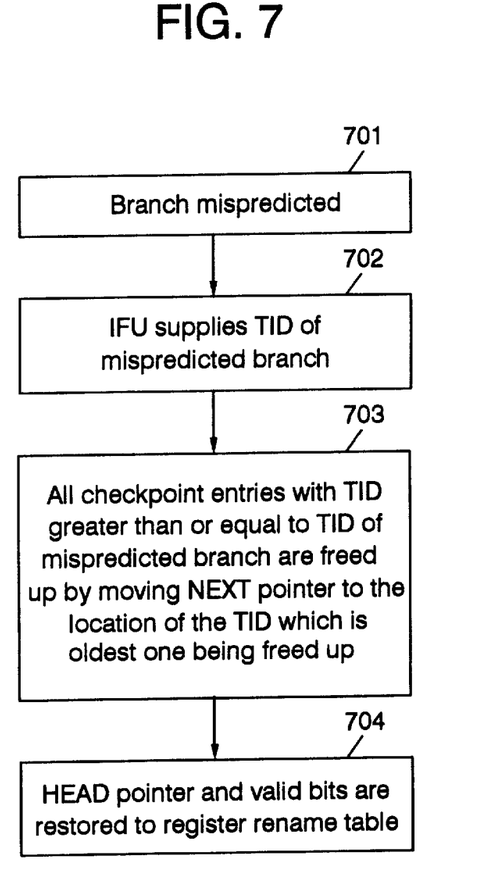
FIG. 7 illustrates a flow diagram of a process for updating the floating point register rename table after a mispredicted branch.

Referring next to FIG. 7, if a branch is determined to have been mispredicted (step 701), the IDU 220 supplies the TID of the mispredicted branch (step 702). All checkpoint entries with a TID greater than (newer) or equal to the TID of the mispredicted branch are freed up by moving the NEXT pointer counterclockwise to the location of the TID which is the oldest one being freed up (step 703). The HEAD pointer and V0 bits are restored to the register rename table from the checkpoint table 302 entry containing the TID which is the oldest one being freed up (step 704). Referring to FIGS. 4 and 5, in other words, checkpoint table 301 takes the valid bit vector corresponding to this entry and replaces the valid bit vector in table 302. All valid bits in table 302 after the new HEAD pointer are invalidated.

Figure 8:
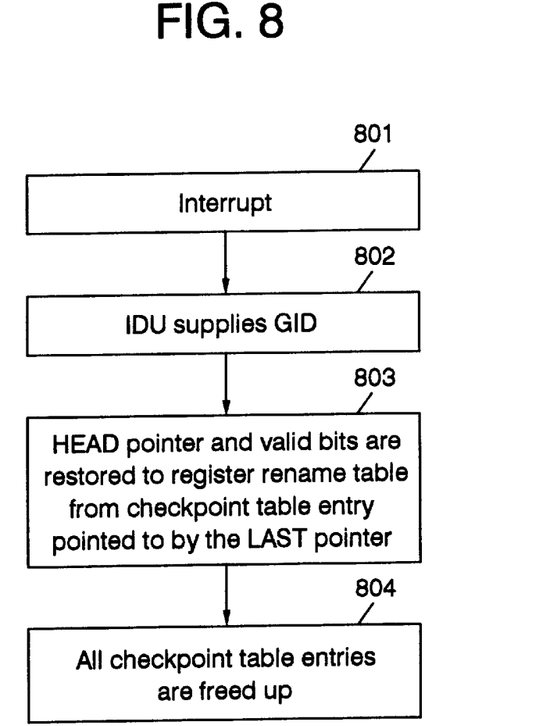
FIG. 8 illustrates a flow diagram of a process for updating the floating point register rename table after an interrupt.

Referring next to FIG. 8, if an interrupt occurs (step 801), the IDU 220 supplies a GID to cancel (step 802). The cancelled GID is by definition the oldest GID in the machine, therefore, the HEAD pointer and V0 bits are restored to the register rename table 302 from the checkpoint table entry pointed to by the LAST pointer (step 803), and all checkpoint table entries are freed up (step 804) by setting the NEXT pointer equal to the LAST pointer.

Although the present invention and its advantages have been described in detail, it should be understood that various changes, substitutions and alterations can be made herein without departing from the spirit and scope of the invention as defined by the appended claims.

What is claimed is:

1. A processor comprising:
    an instruction dispatch unit operable for dispatching instructions to various execution units, including a floating point unit ("FPU");
    a floating point register rename table associated with the FPU and operable for storing states of registers of the FPU for dispatched floating point instructions; and
    a checkpoint table operable for storing states of the floating point register rename table for one or more of the dispatch floating point instructions, wherein the dispatched floating point instructions are non-store instructions, have not been previously committed, and each have a new GID.

2. The processor as recited in claim 1, wherein a checkpoint table entry is not needed for every interruptible instruction or every floating point instruction.

3. The processor as recited in claim 1, wherein each of the states of the floating point register rename table identifies architected register(s), physical register(s), and a valid bit identifying a newest association of a physical register to a particular logical register.

4. The processor as recited in claim 3, wherein each entry of the checkpoint table includes a valid bit vector containing the valid bit for each of the states of the floating point register rename table.

5. The processor as recited in claim 4, wherein the each entry of the checkpoint table includes a program order tag, and wherein when a branch instruction is determined to be mispredicted from an entry of the checkpoint table whose program order tag is oldest of all program order tags in the checkpoint table that are newer or as old as the program order tag of the mispredicted branch instruction, wherein the valid bit vector is used to restore the floating point register rename table to a state before the mispredicted branch instruction.

6. A method for restoring a state of a floating point register rename table, the method comprising the steps of:

dispatching floating point instructions to a floating point unit ("FPU");

storing, in a floating point register rename table associated with the FPU a state of the FPU for each of the dispatched floating point instructions, wherein each of the state includes identification of registers utilized by the each of the dispatched floating point instructions; and storing, in a checkpoint table, a state of the floating point register rename table for one or more of the dispatched floating point instructions, wherein the dispatched floating point instructions are non-store instructions, have not been previously committed, and each have a new GID.

7. The method as recited in claim 6, wherein each the state of the floating point register rename table identifies architected register(s), physical register(s), and a valid bit, if asserted, identifying a newest association of a physical register to a particular logical register.

8. A method for restoring a state of a floating point register rename table, the method comprising the steps of:

dispatching floating point instructions to a floating point unit ("FPU");

storing, in a floating point register rename table associated with the FPU a state of the FPU for each of the dispatched floating point instructions, wherein each of the state includes identification of registers utilized by the each of the dispatched floating point instructions; and storing, in a checkpoint table, a state of the floating point register rename table for one or more of the dispatched floating point instructions, wherein each the state of the floating point register rename table identifies architected register(s), physical resister(s), and a valid bit, if asserted, identifying a newest association of a physical register to a particular logical register, wherein each entry of the checkpoint table includes (1) a valid bit vector containing the valid bit for each the state of the floating point register rename table, (2) a program order tag, (3) a location pointer indicating a first available empty entry in the rename table at a time when the checkpoint entry is entered, (4) a tag indicating a group of instructions which are bounded by outstanding branch or interruptible instructions and which includes an instruction that causes the checkpoint table entry to be created.

9. The method as recited in claim 8, further comprising the step of:

when a branch instruction is determined to be mispredicted, restoring the floating point register rename table to a state before the mispredicted branch instruction by replacing (1) a pointer, which points to a first available empty location in the rename table, and (2) the valid bit vector of the floating point register rename table with the valid bit vector of an entry of the checkpoint table whose program order tag is oldest of all program order tags in the checkpoint table that are newer or as old as the program order tag of the mispredicted branch instruction.

10. The method as recited in claim 9, further comprising the step of:

making available entries within the checkpoint table having a program order tag greater than or equal to the program order tag associated with the mispredicted branch instruction.

11. A method for restoring a state of a floating point register rename table, the method comprising the steps of:

dispatching floating point instructions to a floating point unit ("FPU");

storing, in a floating point register rename table associated with the FPU a state of the FPU for each of the dispatched floating point instructions, wherein each of the state includes identification of registers utilized by the each of the dispatched floating point instructions; and storing, in a checkpoint table, a state of the floating point register rename table for one or more of the dispatched floating point instructions, wherein each the state of the floating point register rename table identifies architected register(s), physical register(s), and a valid bit, if asserted, identifying a newest association of a physical register to a particular logical register, wherein each entry of the checkpoint table includes (1) a valid bit vector containing the valid bit for each the state of the floating point register rename table, and (2) a tag indicating a group of instructions bounded by outstanding branch or interruptible instructions.

12. The method as recited in claim 11, further comprising the step of:

when an interrupt occurs, restoring the floating point register rename table to a state before the interrupt by replacing the valid bit vector of the floating point register rename table with the valid bit vector of an entry of the checkpoint table associated with the location pointer.

13. A data processing system comprising:

a processor;

mass storage;

main memory; and a bus system coupling the processor to the mass storage and to the main memory, wherein the processor further includes:

an instruction dispatch unit operable for dispatching instructions to various execution units, including a floating point unit ("FPU");

a floating point register rename table associated with the FPU and operable for storing states of registers of the FPU for dispatched floating point instructions;

a checkpoint table operable for storing states of the floating point register rename table for one or more of the dispatched floating point instructions, wherein each of the states of the floating point register rename table identifies architected register(s), physical register(s), and a valid bit, wherein each entry of the checkpoint table includes a valid bit vector containing the valid bit for each of the states of the floating point register rename table, wherein the each entry of the checkpoint table includes a program order tag; and circuitry for restoring, when a branch instruction is determined to be mispredicted, the floating point register rename table to a state before the mispredicted branch instruction by replacing the valid bit vector of the floating point register rename table with the valid bit vector of an entry of the checkpoint table whose program order tag is oldest of all program order tags in the checkpoint table that are newer or as old as the program order tag of the mispredicted branch instruction, wherein the dispatched floating point instructions are non-store instructions, and have not been previously committed, wherein each entry of the checkpoint table includes (1) a valid bit vector containing the valid bit for each the state of the floating point register rename table, (2) a program order tag, and (3) a location pointer indicating a first available empty entry in the rename table at a time when the checkpoint entry is entered, (4) a tag indicating a group of instructions which are bounded by outstanding branch or interruptible instructions and which includes an instruction that causes the checkpoint table entry to be created.

* * * * *